United States Patent [19]

Thorn

[11] Patent Number: 4,753,422
[45] Date of Patent: Jun. 28, 1988

[54] QUIET ACTING LOW FRICTION DECOUPLERS FOR FLUID FILLED VIBRATION ISOLATORS

[76] Inventor: Richard P. Thorn, c/o Lord Corporation, 1635 W. 12th St., Erie, Pa. 16512

[21] Appl. No.: 824,113

[22] Filed: Jan. 30, 1986

[51] Int. Cl.⁴ .................... F16M 5/00; F16M 13/00; B62D 21/00
[52] U.S. Cl. ................... 267/140.1; 180/312; 248/562; 267/219
[58] Field of Search ............. 267/8 R, 35, 63 R, 136, 267/140.1, 141, 141.2, 141.4, 140.4, 153, 219; 188/268, 298; 180/300, 312; 248/559, 562, 636; 123/192 R, 195 A

[56] References Cited

U.S. PATENT DOCUMENTS

| | | | |
|---|---|---|---|
| 4,159,091 | 6/1979 | Le Salver et al. | 248/562 |
| 4,236,607 | 12/1980 | Halwes et al. | 188/1 B |
| 4,391,435 | 7/1983 | Pham | 267/140.1 |
| 4,422,779 | 12/1983 | Hamaekers et al. | 384/99 |
| 4,428,569 | 1/1984 | Takei | 267/140.1 |
| 4,437,653 | 3/1984 | Kakimoto | 267/140.1 |
| 4,469,316 | 9/1984 | van den Boom et al. | 267/140.1 |
| 4,483,521 | 11/1984 | Kakimoto | 267/8 R |
| 4,502,575 | 3/1985 | Fukushima et al. | 188/282 |

FOREIGN PATENT DOCUMENTS

| | | |
|---|---|---|
| 0027751 | 4/1981 | European Pat. Off. . |
| 0012638 | 3/1982 | European Pat. Off. . |
| 0209883 | 7/1986 | European Pat. Off. . |
| 2833776 | 1/1980 | Fed. Rep. of Germany ... 267/140.1 |
| 3340153 | 8/1984 | Fed. Rep. of Germany ..... 267/8 R |
| 3407553 | 9/1985 | Fed. Rep. of Germany ...... 248/562 |
| 58-37337 | 3/1983 | Japan . |
| 2041485 | 9/1980 | United Kingdom ............. 267/140.1 |
| 2104619 | 3/1983 | United Kingdom . |

OTHER PUBLICATIONS

SAE Technical Paper Series No. 840259, 1984, "A New Generation of Engine Mounts", Marc Bernuchon.

Primary Examiner—Andres Kashnikow
Assistant Examiner—Robert J. Oberleitner

[57] ABSTRACT

A fluid filled vibration isolator having a housing having a pair of chambers for containing a working fluid, an inertia track passageway a decoupler means cooperable with the inertia track to control fluid flow having a decoupler disc that utilizes a hydrodynamic fluid wedge to center the decoupler disc and minimize friction while providing a positive and quiet coupling and decoupling action.

9 Claims, 2 Drawing Sheets

QUIET ACTING LOW FRICTION DECOUPLERS FOR FLUID FILLED VIBRATION ISOLATORS

FIELD OF THE INVENTION

The present invention relates to fluid filled vibration isolators, and more particularly, the present invention relates to such isolators of the type having inertia track passageways and disc-type decoupler assemblies.

BACKGROUND OF THE INVENTION

A conventional fluid filled vibration isolator includes a housing having at least one flexible wall portion and a partition dividing the interior of the housing into a pair of fluid tight chambers adapted to contain a working fluid. An inertia track or passageway provides fluid communication between the two chambers, and a decoupler element is mounted in the partition and cooperates with the inertia track passageway to couple and decouple the same to control the dynamic stiffness characteristics of the isolator. The conventional decoupler may include either a diaphragm or a circular disc guided within a similarly-shaped passageway.

For a more complete discussion of the structure and operational characteristics of fluid filled vibration isolators, reference is made to an article entitled *A New Generation of Engine Mounts*, by Marc Bernuchon, SAE Technical Paper Series 840259, 1984, the disclosure of which is incorporated by reference herein.

In isolators having disc-type decouplers the disc can engage the wall of the passageway as the disc oscillates under certain conditions. When this occurs, friction develops, and this affects adversely the operation of the decoupler. Also, a desirable decoupler should be capable of seating tightly even when subjected to substantial pressure differentials. Furthermore, a desirable decoupler should operate noiselessly.

OBJECTS OF THE INVENTION

With the foregoing in mind, a primary object of the present invention is to provide an improved disc-type decoupler for fluid filled vibration isolators having inertia track passageways.

Another object of the present invention is to provide a decoupler which operates with a minimum of friction in a fluid filled vibration isolator.

A further object of the present invention is to provide a decoupler having a self-centering capability for minimizing wear and friction creating contact.

A still further object of the present invention is to provide a decoupler disc which seals positively even when subjected to relatively high pressure differentials.

Yet another object of the present invention is to provide a decoupler disc which functions quietly to control fluid flow in a fluid filled vibration isolator.

SUMMARY OF THE INVENTION

More specifically, in the present invention a fluid filled vibration isolator having means providing a passage between opposed working fluid chambers, a decoupler disc mounted within the passage, and a pair of seats limiting oscillation of the decoupler disc within the passage is provided with improvements in the configuration of the decoupler disc and passage which cooperate to provide a hydrodynamic wedge action between the periphery of the disc and its passage for the purpose of reducing friction and improving the performance of the vibration isolator under certain conditions. Preferably, the hydrodynamic effect is realized by providing double tapers either on the rim of the disc or on the wall of the passage, the double tapers being of a relatively small acute angle on the order of a few degrees. Also, the decoupler discs are preferably concave on opposite sides and have relatively narrow peripheral surfaces which are readily deformable to effect a quiet and positive sealing action with respect to the decoupler disc seats. The decoupler disc may be made from materials of various densities or may include a dense member to vary its inertia. Also, an orifice may be incorporated in the disc to provide higher frequency tuning characteristics.

BRIEF DESCRIPTION OF THE DRAWINGS

The foregoing and other objects, features and advantages should become apparent from the following description when taken in conjunction with the accompanying drawings, in which.

DESCRIPTION OF THE PREFERRED EMBODIMENTS

Figure 1:
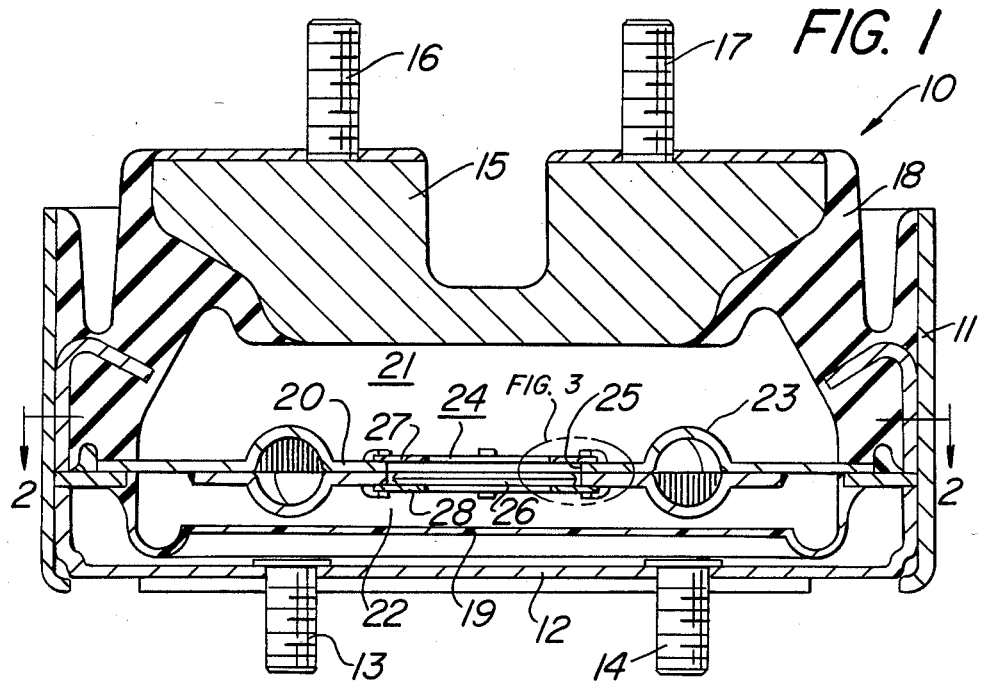
FIG. 1 is a transverse sectional view of a fluid filled vibration isolator having a decoupler assembly embodying the present invention.

Referring now to the drawings, FIG. 1 illustrates a fluid filled vibration isolator 10 which embodies the present invention. The isolator 10 includes a housing 11 having a rigid bottom wall 12 with a plurality of threaded mounting studs 13, 14 depending therefrom. A rigid upper wall 15 with a plurality of projecting threaded mounting studs 16 and 17 is connected to the sides of the housing 11 by a convex block of molded elastomeric material 18 which flexes and permits the upper wall 15 to oscillate vertically with respect to the housing 11. A lower flexible wall 19 of elastomeric material extends across the housing 11 above and substantially parallel to the lower wall 12. A partition 20 extends across the housing 11 and defines with the upper wall 15 and the flexible elastomeric block 18 an upper primary, or working, fluid tight pumping chamber 21 filled with a substantially incompressible fluid (not shown) such as a mixture of ethylene glycol and water. The partition 20 defines with the lower flexible wall 19 a lower secondary, or expansion, fluid tight chamber 22 which expands and contracts in the normal course of operation of the isolator 10 for receiving working fluid displaced from the upper chamber 21.

Figure 2:
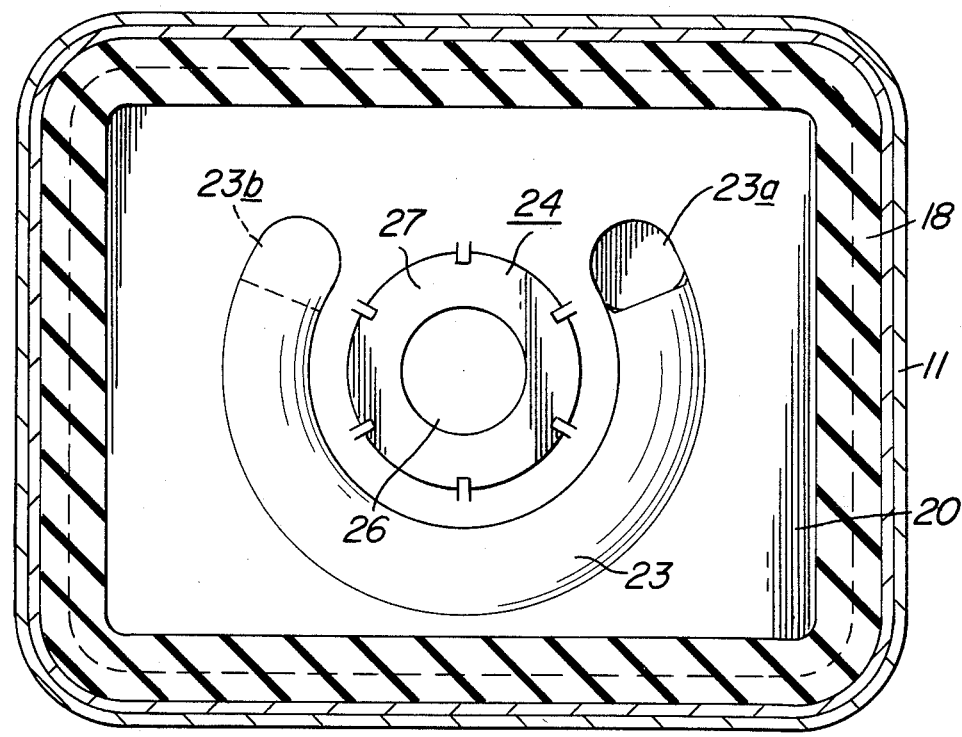
FIG. 2 is a plan view taken on line 2—2 of FIG. 1.

For the purpose of providing fluid communication between the upper primary working chamber 21 and the lower secondary expansion chamber 22, a so-called inertia track passageway 23 is provided. As best seen in FIG. 2, the inertia track passageway 23 is arcuate and has a substantially uniform circular cross-section throughout its entire length. The inertia track passageway 23 has a port 23a at one end opening into the upper chamber 21 and a port 23b at its opposite end opening into the lower chamber 22. The dimensions of the inertia track passageway affect the mass of fluid contained therein and thus affects the resonant frequency of the fluid effect of the isolator 10.

During operation, oscillating movement of the upper wall 15 relative to the partition 20, as by movement of a member connected to its studs 16, 17, causes working fluid to oscillate in the inertia track passageway 23 between the primary chamber 21 and the secondary chamber 22. A vibration isolator of this construction may have a minimum complex dynamic stiffness at a relatively low excitation frequency and over a relatively narrow range of frequencies. For many applications, it is desirable for the inertia track passageway 23 to be relatively inactive, or decoupled, at small amplitudes of excitation, and active, or coupled, at higher amplitudes of excitation over a range of frequencies.

In order to couple and decouple the inertia track passageway 23 and the upper and lower chambers 21 and 22 at certain amplitudes of vibration, it is known to provide decoupling means in the partition 20. As discussed heretofore, the conventional decoupling means includes a cylindrical passage extending through the partition 20, and may include either a diaphragm therein (not shown) or a disc 26, slightly smaller in size than the passage 25, mounted therewithin for oscillation between upper and lower annular seating elements 27 and 28, respectively in response to vibrations of small amplitude. Amplitudes of vibration in excess of a predetermined small level cause the disc 26 to seat against either its upper annular seat 27 or its lower annular seat 28 for blocking flow through the passage 25 and thereby requiring all fluid to flow in the inertia track 23 between the chambers 21 and 22.

Conventional decoupler discs are generally either molded or punched from flat material and have peripheral edges defining right angle intersections with the opposite sides thereof. Such discs are generally fabricated of rigid elastomeric or plastic materials, and the seats and passages in which they are mounted are generally made of metal. The discs are of a circular shape and are of a diameter slightly smaller than the diameter of the passage in which they oscillate.

It has been determined that under certain operating conditions, the decoupler discs tend to generate audible noises when they seat. Such noises are undesirable when the isolators are used to mount engines and transmissions in automobiles because the noises can be transmitted into the passenger compartment of the automobile. In addition, it has been found that in certain vibration isolators, the decoupler discs tend to oscillate off-center and to rub against the inner periphery of their mounting passages, or cavities, and this creates friction which has been found to affect adversely the performance of vibration isolators. Moreover, it has been determined that the leak resistance of the joint between the decoupler disc and its seats can affect adversely the performance of the vibration isolator, particularly under high pressure conditions.

The present invention overcomes the aforementioned limitations of known decouplers by providing a decoupler wherein a hydrodynamic wedging action is created between the outer periphery of the decoupler disc and the inner periphery of its mounting cavity. As a result, the decoupler disc centers itself as it oscillates. Thus, frictional engagement between the disc and its mounting cavity is eliminated, and the performance of the vibration isolator improved.

The present invention also provides a decoupler disc having various edge configurations which provide a zone of reduced stiffness adjacent the periphery of the disc both to minimize noise generated in the course of operation of the decoupler and to provide a leak resistant joint. The edge configuration may be designed to provide both the desired low stiffness properties and the desired hydrodynamic wedging action.

Figure 3:
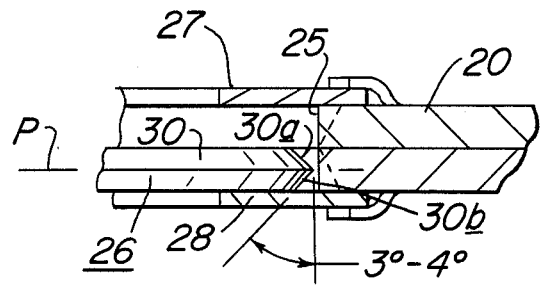
FIG. 3 is a greatly enlarged fragmentary cross-sectional view illustrating a portion of the decoupler assembly of the present invention.

Referring again to the drawings, FIG. 3 illustrates a decoupler disc 26 which embodies the present invention. The disc 26 is circular in plan and is symmetrical with respect to a medial plane P. The disc 26 has an outer peripheral portion 30 located adjacent to the inner peripheral wall of the passage, or cavity, 25 in which the decoupler disc 26 oscillates. In the embodiment of FIG. 3, the outer peripheral portion 30 of the decoupler disc 26 has a double tapered edge configuration with flat surfaces 30a and 30b tapering or inclining radially inward and axially in opposite directions with respect to the medial plane P. Preferably, the surfaces 30a and 30b taper at the same angle with respect to a line orthogonal to the plane P, and desirably, the angles are acute and in a range of about 3° to about 4°, such angles being illustrated greatly enlarged. A slight clearance, on the order of about 0.005 inch is preferably provided between the outer periphery of the decoupler disc 30 and the inner periphery of the passage 25. Preferably, the decoupler disc 26 is molded of an elastomeric material. If desired, the outer peripheral edge of the decoupler disc 26 may be flat and the tapered surfaces provided on the inner periphery of the passage 25, such as in the manner indicated in phantom lines in FIG. 3.

In operation, as the decoupler disc 26 moves upwardly in the cavity 25, a hydrodynamic wedge is created between its surface 30a and the adjacent surface of the passage 25. Because the surfaces 30a and 30b are continuous about the entire periphery of the disc 26, the hydrodynamic wedge centers the decoupler disc 26 as it advances upwardly. In like manner, the tapered surface 30b cooperates with the inner periphery of the wall 25 during downward motion of the decoupler disc 26 to effect the same type of centering action. As a result, direct engagement, and hence frictional contact, between the outer periphery of the decoupler disc 26 and its mounting passage 25 is avoided, thereby eliminating the undesirable performance characteristics such frictional contact would normally generate.

Figure 4:
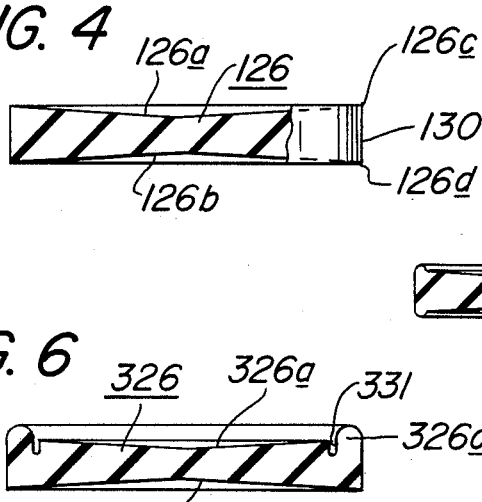
FIG. 4 is a greatly enlarged view in transverse cross-section of one modified embodiment of a decoupler disc of the present invention.

Turning now to FIG. 4, the decoupler disc 126 illustrated therein is circular like the disc 26 and is similarly symmetrical. Unlike the disc 26, the modified decoupler disc 126 has a flat outer peripheral edge 130. With this disc configuration, if a hydrodynamic wedging action is desired, the double tapered surfaces could be provided on the inner periphery of the mounting passage or on the peripheral edge of the decoupler disc, as discussed above.

In the embodiment of FIG. 4, the decoupler disc 126 is molded entirely of a resilient material, such as an elastomer in such a way to be imperforate. The upper surface 126a of the decoupler disc 126 is recessed interiorly of its edge 130 as is its lower surface 126b. The surfaces 126a and 126b cooperate with the peripheral edge surface 130 to define continuous annular edges, or ridges, 126c and 126d of a narrow radial extent about the periphery of the decoupler disc 126. Thus, feathered edges are provided which taper in a direction orthogonal to the medial plane P adjacent the outer periphery of the disc 126 on opposite sides thereof so that by virtue of this cross-sectional configuration, the decoupler disc 126 has a stiffness measured transverse to its medial plane P which varies from a minimum adjacent its outer periphery 130. Preferably, the stiffness is in a range of about 1.0 to about 20.0 pounds per inch adjacent the outer periphery of the disc.

As a result, when the decoupler disc 126 is pressed against either one of its seating plates, it deforms locally initially adjacent its periphery and then progressively radially inward in an amount corresponding to the amount of pressure applied. When the decoupler disc 126 makes initial contact with either of its seats, however, the relatively narrow edges function quietly to absorb initial contact and thereby to prevent audible noise from being generated. Hence, this embodiment provides both a leak-resistant and quiet acting decoupler assembly.

Figure 5:
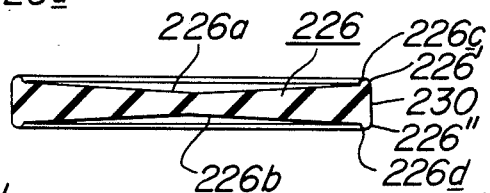
FIG. 5 is a transverse cross-sectional view of another modified embodiment of a decoupler disc.

Another modified embodiment of a decoupler disc is illustrated in FIG. 5. The decoupler disc 226 is circular and symmetrical and preferably fabricated of a resilient elastomeric material, such as rubber. The decoupler disc 226 has recessed upper and lower sides 226a and 226b and upper and lower peripheral ridges or flanges 226c and 226d. dEach ridge, such as the upper ridge 226c, has a relatively narrow radial extent and tapers, or curves, radially with respect to a line orthogonal to the medial plane of the disc 226. As a result, the disc 226 has adjacent its outer periphery a zone of relatively low stiffness and functions in much the same manner as the disc 126 to provide the desirable noise attenuating and sealing action. In the embodiment of FIG. 5, however, the outer peripheral edge 230 of the disc 226 tapers or curves radially inward at 226′, 226″ with respect to the upper and lower ridges 226c and 226d, respectively. The curved surfaces 226′, 226″ function in much the same manner as the surfaces 30a, 30b to provide a hydrodynamic wedging action which operates to center the decoupler disc 226 as it oscillates in its mounting passage. Thus, the embodiment of FIG. 5 combines the self-centering features of the embodiment of FIG. 3 with the sealing and noise attenuating features of FIG. 4.

Figure 6:
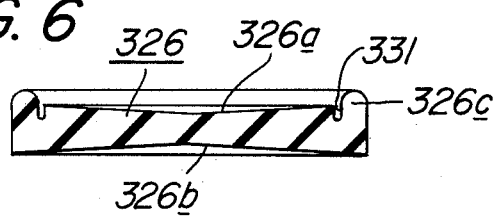
FIG. 6 is a transverse cross-sectional view of a further modified embodiment of a decoupler disc.

The embodiment of FIG. 6 is particularly well suited for use in applications where a better leak resistant joint is required on one side of the disc than the other. In this embodiment, the decoupler disc 326 has an outer peripheral ridge 326c much like the ridge 226c in the embodiment of FIG. 5. The disc 326 has recessed upper and lower central portions 326a and 326b, respectively, much like the recessed sides of the disc 126 in FIG. 4. In this embodiment, however, a groove 331 is provided interiorly of the ridge 326c in the topside 326a of the disc 326. The groove 331 increases the flexibility of the ridge 326c in the radial direction and thereby improves the sealing action which results when the ridge 326c is pressed up against its cooperating seat. Preferably, the disc 326 is installed in a vibration isolator with the ridge 326c confronting the lower pressure side of the isolator, e.g. the lower chamber 22 in FIG. 1.

Figure 7:
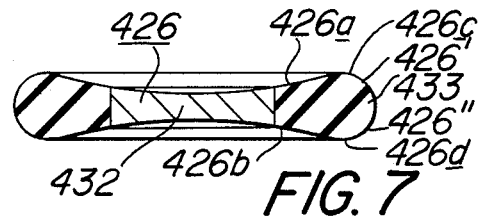
FIG. 7 is a transverse sectional view of yet another modified embodiment of a decoupler disc.

Another modified embodiment of the decoupler disc of the present invention is illustrated in FIG. 7. In this embodiment, the decoupler disc 426 has a central section 432 formed of a rigid material, such as metal, and an annular bulbous section 433 of resilient material, such as an elastomer, bonded to and surrounding the metal central section. The bulbous section 433 defines upper and lower ridges 426c and 426d, respectively and upper and lower inwardly curving or tapered surface portions 426′, 426″, respectively. Opposite sides of the central section of the decoupler disc 426 are recessed at 426a, 426b. With this construction, the upper and lower ridges 426c, 426d provide the desired seating softness and sealing function while the inwardly curving edge portions 426′, 426″ provide the desired hydrodynamic wedging action. The rigid circular member 432 can be fabricated of a variety of materials of various densities, including metal, depending upon the inertia desired to be incorporated in the decoupler disc 426 and the desired tuning to be achieved thereby.

Figure 8:
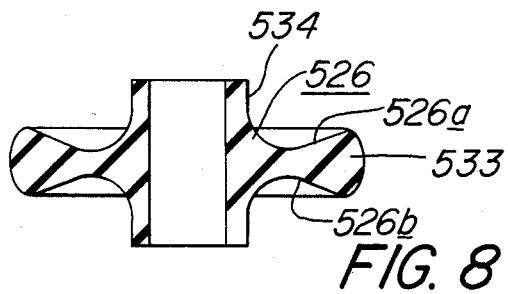
FIG. 8 is a transverse sectional view of a still further modified embodiment of a decoupler disc of the present invention.

The embodiment illustrated in FIG. 8 provides the advantages noted heretofore with respect to previous mentioned embodiments, and in addition, includes a built-in short length inertia track passageway. The decoupler disc 526 has a bulbous outer peripheral portion 533, similar to the bulbous portion 433 of the embodiment in FIG. 7, and a pair of upper and lower annular recesses 526a, 526b inwardly adjacent thereto. A short length tubular passage 534 is molded centrally of the decoupler disc 526 and extends axially in opposite directions orthogonal to the medial plane of the disc 526. The length of the decoupler passage 534 is preferably less than the diameter of the decoupler disc 526, and its cross-sectional area is also relatively small relative to the area of the disc 526. In this embodiment, the passage 534 provides fluid communication between the chambers even when seated. Thus, the decoupler disc 526 incorporates the advantages noted heretofore with respect to the previous embodiments and in addition provides a short length inertia track in combination therewith.

In view of the foregoing, it should be apparent that the present invention now provides improved disc-type decoupler means for use in fluid filled vibration isolators to improve the overall performance thereof. The decoupler discs of the present invention also function quietly in a leak resistant manner. Because the decoupler discs of the present invention are of relatively simple construction, they can be manufactured inexpensively by low cost, high speed mass production techniques.

While preferred embodiments of the present invention have been described in detail, various modifications, alterations and changes may be made without departing from the scope of the present invention as defined in the appended claims.

I claim:

1. In a fluid filled vibration isolator including a housing having a pair of chambers for containing a working fluid, an inertia track passageway with ports at opposite ends providing fluid communication between the chambers, and decoupler means in fluid communication with the chambers and cooperable with the inertia track to control fluid flow under certain operating conditions, the decoupler means including means providing a passage between the chambers, an imperforate decoupler disc mounted in the passage for translatory movement in response to fluid flow therein, and spaced seats in the passage alternately engageable by the decoupler disc to block flow through the passage, said imperforate decoupler disc and passage having spaced confronting peripheral portions extending in the direction of flow in the passage for permitting said translatory movement, the improvement comprising surface means located on at least one of said spaced confronting portions for cooperating with the working fluid to provide a hydrodynamic wedge about the periphery of the decoupler disc to operatively center the disc as it oscillates in said passage, said surface means including a pair of tapered surfaces intersecting at about the medial plane of the imperforate decoupler disc and a surface extending along said tapered surfaces in closely spaced juxtaposition there with and movable relative thereto as said disc translates, each tapered surface defining an angle in a range of about 3 degrees to about 4 degrees with respect to a line orthogonal to said medial plane, whereby the imperforate decoupler disc centers itself as it oscillates to minimize frictional contact within its passage.

2. A vibration isolator according to claim 1 wherein said tapered surfaces are on the periphery of the imperforate decoupler disc.

3. A vibration isolator according to claim 2 wherein said tapering surface curves radially inward on opposite sides of said medial plane.

4. A vibration isolator according to claim 2 wherein said tapering surface is substantially flat and inclines radially inward on opposite sides of said medial plane.

5. A vibration isolator according to claim 1 wherein said surface means is located on the inner periphery of said passage and cooperates with the outer peripheral edge of the imperforate decoupler disc to define an included angle therebetween in said range.

6. A vibration isolator according to claim 1 including resilient means carried on opposite sides of said decoupler disc adjacent the periphery thereof for providing an annular zone of minimum stiffness adjacent the periphery of the decoupler disc.

7. In a fluid filled vibration isolator including a housing having a pair of chambers for containing a working fluid, an inertia track passageway with ports at opposite ends providing fluid communication between the chambers, and decoupler means in fluid communication with the chambers and cooperable with the inertia track to control fluid flow under certain operating conditions, the decoupler means including means providing a passage between the chambers, a decoupler disc mounted in the passage for translatory movement in response to fluid flow therein, and spaced seats in the passage alternately engageable by the decoupler disc to block flow through the passage, said decoupler disc and passage having spaced confronting peripheral portions extending in the direction of flow in the passage for permitting said translatory movement, the improvement wherein said decoupler disc has means defining a pair of annular ridges on its opposite sides and is recessed inwardly thereof to provide a predetermined transverse stiffness in the range of about 1.0 to about 20.0 pounds per inch in an annular zone adjacent its periphery which varies in the radial direction from a minimum adjacent the periphery thereof to quietly arrest said translatory movement and to provide a soft leak resistant sealing action when the disc is operatively engaged with its seats.

8. In a fluid filled vibration isolator including a housing having a pair of chambers for containing a working fluid, an inertia track passageway with ports at opposite ends providing fluid communication between the chambers, and decoupler means in fluid communication with the chambers and cooperable with the inertia track passageway to control fluid flow under certain operating conditions, the decoupler means including means providing a passage between the chambers, a decoupler disc mounted in the passage for movement in response to fluid flow therein, and spaced seats in the passage alternately engageable by the decoupler disc to block flow through the passage, the improvement comprising means providing upstanding resiliently deformable flanges around the periphery of the decoupler disc on opposite sides thereof, said flanges extending in opposite directions in the path of movement of the disc in its passage, the disc having an annular zone of reduced thickness interiorly of the peripheral flanges so that the stiffness of the disc is at a minimum across the flanges, at least the outer peripheral portion of the disc being fabricated of resilient material, whereby the decoupler disc cooperates with its seats and the working fluid to provide a low friction, leak resistant, relatively noiseless decoupling action.

9. In a fluid filled vibration isolator including a housing having a pair of chambers for containing a working fluid, an inertia track passageway with ports at opposite ends providing fluid communication between the chambers, and decoupler means in fluid communication with the chambers and cooperable with the inertia track to control fluid flow under certain operating conditions, the decoupler means including means providing a passage between the chambers, a decoupler disc mounted in the passage for translatory movement in response to fluid flow therein, and spaced seats in the passage alternately engageable by the decoupler disc to block flow through the passage, said decoupler disc and passage having spaced confronting peripheral portions extending in the direction of flow in the passage for permitting said translatory movement, wherein at least one of said peripheral portions has surface means thereon for cooperating with the working fluid to provide a hydrodynamic wedge about the periphery of the decoupler disc to operatively center the disc as it oscillates in the passage, said surface means including a pair of surfaces converging at about the medial plane of said disc and a surface extending along said converging surfaces in closely spaced juxtaposition therewith, said pair of surfaces defining with their said juxtaposed surface, a wedge angle in a range of about 3 degrees to about 4 degrees, said pair of surfaces and their said juxtaposed surfaces being movable relative to one another during said translatory movement of said decoupler disc to provide said hydrodynamic wedging action about the periphery of the disc, the improvement wherein said decoupler disc has means defining a pair of annular ridges on its opposite sides and is recessed inwardly thereof to provide a predetermined transverse stiffness which varies in the radial direction from a minimum adjacent the periphery thereof to quietly arrest said translatory movement and to provide a soft leak resistant sealing action when the disc is operatively engaged with its seats.

* * * * *